W. W. LOCKWOOD.
HAY STACKER.
APPLICATION FILED NOV. 22, 1916.

1,243,746.

Patented Oct. 23, 1917.
3 SHEETS—SHEET 1.

WITNESSES

INVENTOR
W. W. LOCKWOOD

BY

ATTYS.

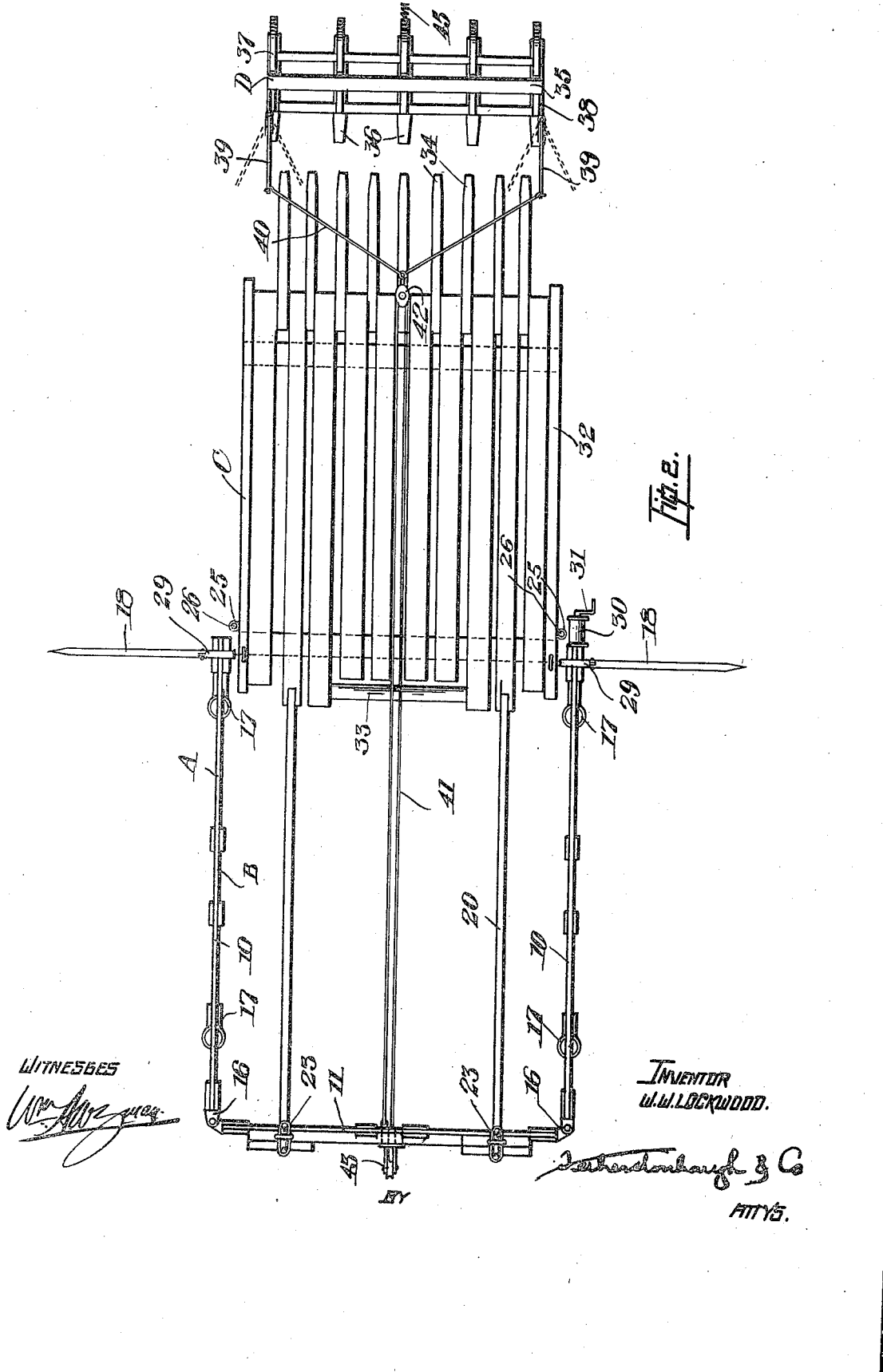

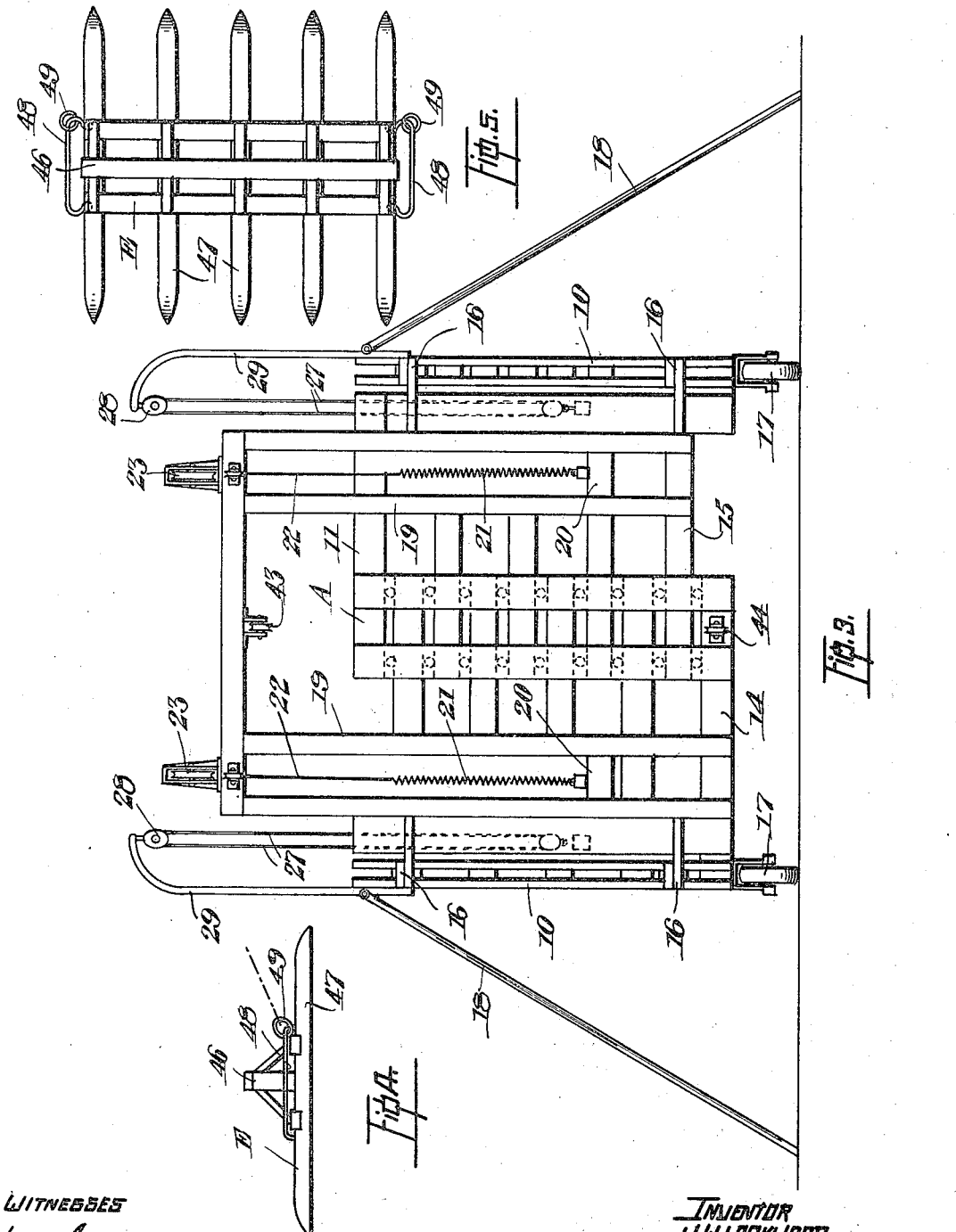

UNITED STATES PATENT OFFICE.

WILLIAM WALLACE LOCKWOOD, OF SASKATOON, SASKATCHEWAN, CANADA.

HAY-STACKER.

1,243,746.   Specification of Letters Patent.   Patented Oct. 23, 1917.

Application filed November 22, 1916. Serial No. 132,863.

*To all whom it may concern:*

Be it known that I, WILLIAM WALLACE LOCKWOOD, a subject of the King of Great Britain, and resident of Saskatoon, in the Province of Saskatchewan, Dominion of Canada, have invented certain new and useful Improvements in Hay-Stackers, of which the following is the specification.

This invention relates to improvements in hay-stackers, and the objects of the invention are to permit of the container of the machine being readily adjusted to suit the size of the stack being made, to automatically pack the hay during the operation of stacking, to permit of the vertical adjustment of the loading platform, to facilitate dumping the hay and uniformly spreading on the top of the stack, to simplify the several parts and generally to adapt the machine to better perform the functions required of it.

With the above and other objects in view, the invention consists essentially of the improved construction particularly described and set forth in the following specification and accompanying drawings forming part of the same.

In the drawings,

Fig. 2 is a plan view of the same.

Fig. 3 is a rear view of the improved stacker.

Fig. 4 is a side elevation of the hay-gathering sweep.

Fig. 5 is a plan view of the same.

Like characters of reference refer to like parts in the several figures.

Figure 1:
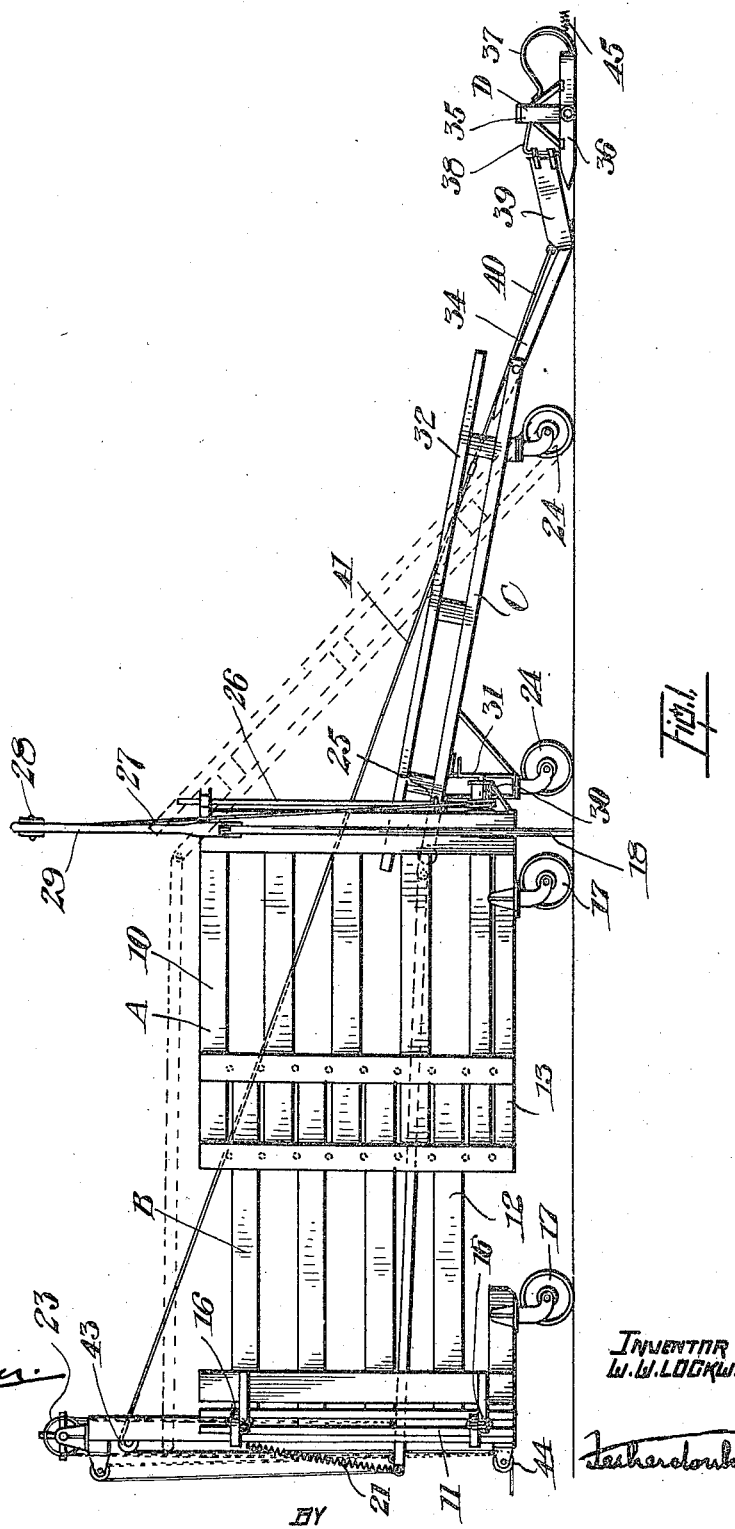
Figure 1 is a side elevation of the improved stacker.

Referring to the drawings, A represents the improved stacker comprising the hay container B, platform C, and loader D operatively connected together. The container B consists of the side and back members 10 and 11, the former of which are formed of the two sections 12 and 13 and the latter the two sections 14 and 15 slidably connected together, the back and side members being hinged as shown at 16.

This container is provided with wheels or casters 17 which run along the ground and the front end of the side members 10 are supported by the angularly disposed stays 18, the object of which will be made clear hereafter.

The back 11 is also provided with a pair of vertically disposed guides 19 in which the rear end of the skids 20 slidably engage, the front of the skids being pivotally attached to the loading platform C.

These skids are connected at their rear ends to the springs 21 which in turn are attached to the flexible member 22 passing over the pulleys 23 mounted on the back member 11 of the container, the flexible members being attached at their free end to any suitable anchoring means which permit of the ready elevation of the said skids.

The platform C is also provided with rollers or casters 24 which run along the ground, the rear end of the platform being provided with staples 25 adapted to slidably engage with the vertically disposed rod 26 arranged at the ends of the side members 10.

The rear end of the platform C is elevated by the flexible member 27 passing over the pulleys 28 rotatably mounted on the davits 29, the free end of the flexible member being coiled around the elevating drums 30 mounted on the side members 10 and provided with a crank handle 31 by means of which the drums are manually rotated.

The platform is provided with side members 32 and carries at the front end the rotatably mounted roller 33, while the rear end is pivotally connected to the angularly disposed fingers 34, the outer end of which engages the ground.

The loader D consists of a U-shaped frame 35 which embraces and is operatively connected to a plurality of fingers which engage with the ground, the rear end of the fingers being attached to the curvilinear retaining members 37, the other ends of which are connected to the frame 35.

This frame is also provided on its front end with brackets 38 which hingedly support the doors 39 connected at the front end by the bridle 40 to the hauling rope 41.

This bridle is provided with a roller or block 42 with which the hauling rope 41 engages, the said hauling rope extending over the pulley 43 mounted on the back member 11 intermediate of the ends thereof and then passing around the pulley 44, mounted on the lower end of the said back member, the free end of the hauling rope being designed to be attached to the horse or like traction means which draws the loader D up over the platform C to engage with the skids 20 and so deposit the load of hay in the container B. The loader D is returned to its loading position by the spiral spring 45.

The hay is primarily collected by the sweeps E which consists of a frame 46 provided with a plurality of equidistantly spaced fingers 47 on the lower end thereof and having longitudinally disposed guides mounted on the sides with which the rings 49 loosely engage, so that when traction is applied to the said sweeps through the rings 49 the sweeps may be with equal success operated in either direction.

The assembly of the stacker will be readily understood from the foregoing description.

When the machine is in use the back and side members 11 and 10 of the container B are extended to the desired extent and if it is found desirable the side members may be angularly disposed by rotating them about the hinges 16 and when the container has been arranged in the desired position the stays 18 are engaged with the ground to prevent the lateral displacement of the side members 10.

The hay collected by the sweeps E is delivered to the loader D and when the tractive force has been applied to the hauling rope 41 the loader is pulled up over the fingers 34 and platform C to engage with the skids 20 and due to the fact that these skids are spaced apart the hay is deposited between the same into the container.

When the loader D engages with the skids 20 the said skids are depressed at their rear ends and so pack the hay forming the stack and after the load has been dumped from the loader the springs 21 will elevate the skids and return the loader D under the action of gravity to its normal position.

As the loading of the container B proceeds the rear end of the platform C is elevated by the flexible member 27 while the rear ends of the skids 20 are elevated by the flexible member 22 and the said members assume the position shown by the dotted lines in Fig. 1.

In this position the hauling rope 41 engages with the roller 33 mounted on the rear end of the platform C so that the said hauling rope is adequately guided and will not in any way foul with the stack being formed or any other part of the machine.

During the operation of elevating the platform C the staples 25 engaging with the rods 26 prevent the rear end of the platform from becoming displaced laterally.

It will be understood that the container B is bottomless so that after the stack has been formed the platform C can be readily disengaged from the container which is then removed from the stack the machine being then taken to another part of the field preparatory to building a new stack.

From this description it will be seen that I have invented a haystacker which can be advantageously utilized by farmers and wherein the stacking is mechanically performed, the hay being uniformly formed over the stack and automatically packed during the process of building.

As many changes could be made in the above construction, and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. A hay-stacker of the class described, comprising a container, a platform operatively connected to the container, means for adjusting the platform vertically, a loader coacting with the platform and means for packing the hay delivered to the container.

2. A hay-stacker of the class described, comprising a container, consisting of side and end members arranged in two portions making sliding engagement, stays operatively supporting the front of the side members, a loading platform operatively attached to the container and means for delivering hay to the container, and simultaneously packing the hay in the container.

3. A hay-stacker of the class described, comprising a container, a loading platform operatively attached to the container, loading means coacting with the platform, means for elevating the loading means to the container and resilient means for returning the loading means to a normal position.

4. A hay-stacker of the class described, comprising a container, an adjustable loading platform operatively attached to the container, a plurality of angularly disposed fingers pivotally connected to the rear end of the platform, a loader coacting with the platform, resilient means for returning the loader to a normal position and means for packing the hay in the container.

5. A hay-stacker of the class described, comprising an adjustable container, an adjustable platform operatively attached to the container, skids pivotally attached to the platform and coacting with the rear of the container, means for elevating the skids and a loader coacting with the platform adapted to deliver hay to the container.

6. A hay-stacker of the class described, comprising an adjustable container, an adjustable platform operatively attached to the container, skids pivotally attached to the platform and coacting with the rear end of the container, a loader coacting with the platform and skids and resilient means for elevating the skids when the loader has been dumped.

In witness whereof I have hereunto set my hand in the presence of two witnesses.

WILLIAM WALLACE LOCKWOOD.

Witnesses:
HARRIET BUCHAN,
A. W. HUTCHINSON.

Copies of this patent may be obtained for five cents each, by addressing the "Commissioner of Patents, Washington, D. C."